United States Patent [19]

Wittrisch

[11] Patent Number: 4,794,791
[45] Date of Patent: Jan. 3, 1989

[54] METHOD AND DEVICE FOR MAKING MEASUREMENTS CHARACTERIZING GEOLOGICAL FORMATIONS, IN A HORIZONTAL BOREHOLE FORMED FROM AN UNDERGROUND WAY

[75] Inventor: Christian Wittrisch, Rueil-Malmaison, France

[73] Assignee: Institut Francais du Petrole, Rueil-Malmaison, France

[21] Appl. No.: 30,351

[22] Filed: Mar. 26, 1987

[30] Foreign Application Priority Data

Apr. 4, 1986 [FR] France ................................. 8604960

[51] Int. Cl.⁴ .............................................. E21B 49/00
[52] U.S. Cl. .............................. 73/151; 254/134.3 FT
[58] Field of Search ...................... 73/151, 152, 866.5; 166/66; 299/1; 254/134.3 FT

[56] References Cited

U.S. PATENT DOCUMENTS 3,675,478  7/1972  Nystrom ............................. 73/152

Primary Examiner—Jerry W. Myracle
Attorney, Agent, or Firm—Antonelli, Terry & Wands

[57] ABSTRACT

A method is provided for making measurements in geological formations from a horizontal borehole or a borehole with limited slant with respect to the horizontal, formed in the wall of an underground way. It includes essentially a probe containing measuring instruments, adapted to be introduced and pushed into the borehole at the end of an elongate element such as a semirigid tube which is wound off a storage reel, straightened and moved linearly by feed means. The tube passes through a sealing element disposed at the orifice of the borehole. It contains a transmission cable for connecting the probe to a control and recording assembly and it communicates through a rotary hydraulic and electric collector with a pumping system provided for filling the bored hole with fluid before making the measurements.

12 Claims, 1 Drawing Sheet

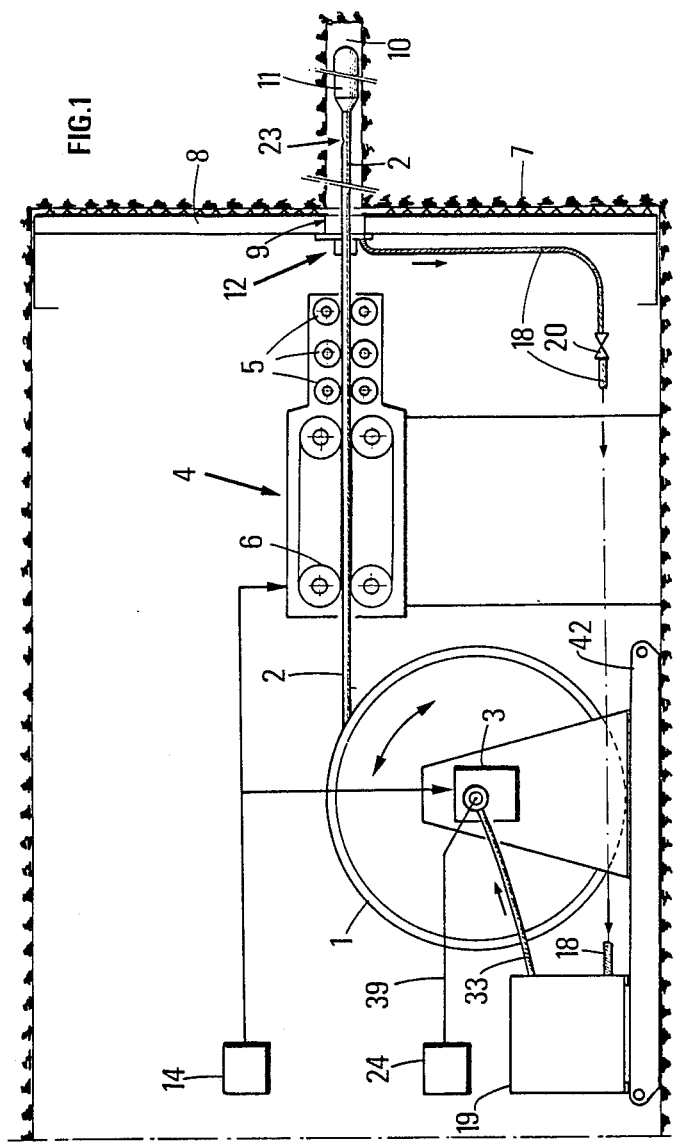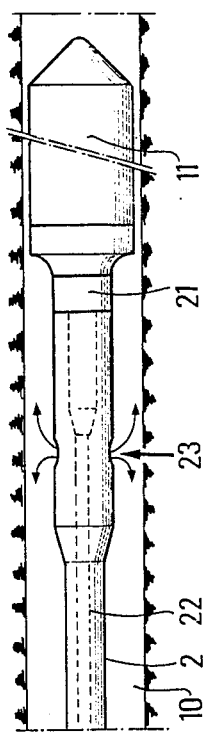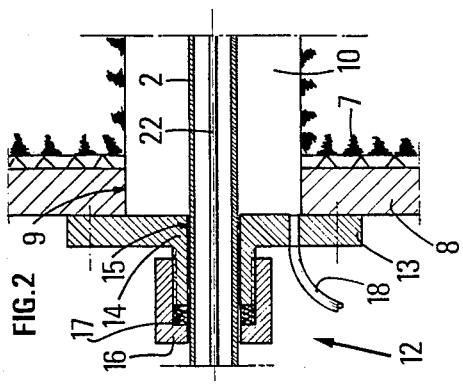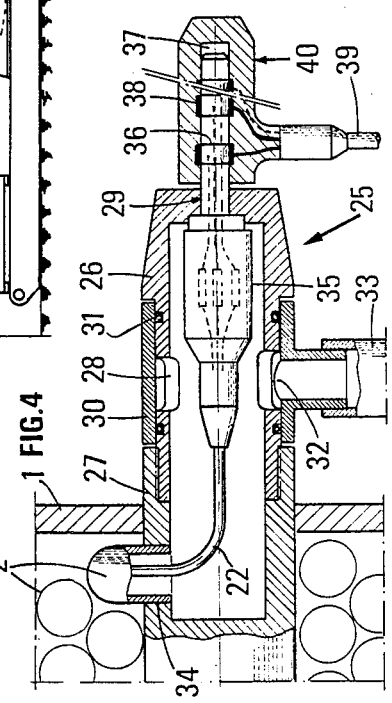

METHOD AND DEVICE FOR MAKING MEASUREMENTS CHARACTERIZING GEOLOGICAL FORMATIONS, IN A HORIZONTAL BOREHOLE FORMED FROM AN UNDERGROUND WAY

BACKGROUND OF THE INVENTION

1. Field of the Invention

The present invention relates to a method and device for making measurements characterizing geological formations in a horizontal borehole or a borehole slightly slanting with respect to the horizontal, formed from an underground way, such as a gallery, a tunnel etc.

The device of the invention finds its application particularly in the study of formations where galleries or tunnels are being pierced, so as to facilitate the advance of the cutting systems used.

2. Description of the Prior Art

A device is known which is used in coal mines for exploring the formations in front of a gallery in the course of construction for defining the contours of a seam and to locate prior to mining the gas pockets which are likely to explode. This device includes a machine for horizontal boring formed essentially by a drilling tool fixed to the end of a hollow rod, a system for driving the rod, and a measuring device formed of a probe with a cross section less than that of the drilling rod, fixed to the end of a cable transmitting the data measured by the probe.

With a hole drilled beforehand, the probe is introduced into the drilling rod and pushed to the end of the rod by pumping means. This prior device is described in the U.S. Pat. No. 4,498,532.

This type of device lends itself well to investigations carried out using probes which may operate inside a tube or a rod, generally made from metal, and so to the use of radiation probes: gamma, neutron rays whose penetration power is very limited. The distance over which a probe can be driven into the formations is limited to the relatively small length of the tube unless it is formed of a string of rods which are progressively connected to each other. But in this case, the previous step for conveying the probe to the bottom of a borehole of several hundreds of meters in length is very long and that considerably delays the effective taking of measurements. Furthermore, the necessity during the withdrawal phase to remove the successive sections of the rod string, involves stoppages and it is impossible to carry out continuous measurements.

Another known method consists in fixing a probe to the end of a rod having a lateral outlet and in connecting the electric connectors of the probe to a cable which extends to the outside through this side outlet. The rod provided with its probe is engaged in the borehole and as it is gradually lowered tube sections are added and the cable is unwound. To the drawbacks already mentioned relating to the slowness of the operations for connecting the tube sections tegether, is added the presence of the cable on the outside, which greatly complicates the construction of a sleeve for sealingly closing the borehole in that this latter may not be filled with the liquid required for coupling an acoustic measuring probe with the formations, for example.

SUMMARY OF THE INVENTION

The method of the invention which is adapted to taking measurements in geological formations from a horizontal borehole or a borehole with a limited slant with respect to the horizontal, avoids the above mentioned drawbacks. It includes fixing a probe containing measuring instruments to an elongate element adapted to be wound on a storage reel, introducing the probe into the borehole and linearly moving the elongate element from the underground way as it unwinds from the storage reel, said elongate element being sufficiently rigid for driving the probe along the borehole, providing continuous measurement cycles during movement thereof and rewinding the elongate element on the storage reel as the probe is withdrawn.

The use of a windable elongate element and feed means ensuring unwinding and driving of this element along a borehole over a distance which may reach several hundreds of meters, until the probe reaches the depth chosen for the measurements, and then rewinding thereof on a storage reel, allow previous exploration of the formations in front of a cutting face to be carried out rapidly. This advantage is particularly appreciable considering the speed of advance of modern machines, used for driving tunnels or galleries. Another important advantage is due to the fact that the unwinding and rewinding of the elongate element being effected without any interruption, measurements may be made continuously along the whole of the borehole.

BRIEF DESCRIPTION OF THE DRAWINGS

Other features and advantages of the device will be clear from reading the following description of one embodiment given by way of non limitative example, with reference to the accompanying drawings in which:

FIG. 1 is a general schematical view of the device during an operation for winding or unwinding the elongate elements;

FIG. 2 shows a sealing element allowing the borehole to be filled with fluid during the measurement taking phase;

FIG. 3 shows the end part of the elongate element and the probe which is fixed thereto; and FIG. 4 shows a rotary hydraulic and electric collector for placing the inside of the elongate element in communication with a fluid pumping assembly and for interconnecting the electric cables running along the element with electric supply and measurement data collection means.

DESCRIPTION OF THE PREFERRED EMBODIMENT

Referring to FIG. 1, it can be seen that the device includes a storage reel 1 on which is wound an elongate element formed for example by a semirigid tube 2 of known type. The reel is driven by a hydraulic motor 3. The tube 2 winding off reel 1 passes into a feed device 4. This latter includes for example two rows of aligned rollers 15 for straightening it, driving tracks 6 actuated by a hydraulic motor (not shown) as well as counting means for determining the length of the tube introduced into the borehole.

The machines used for driving galleries or tunnels 7 generally include a shield 8 in which numerous orifices are formed for different tools and particularly drilling tools. Through one of these orifices 9 is introduced the tool of a drilling system adapted for drilling a hole 10 which may reach several hundreds of meters and of a sufficient diameter for introducing therein a measuring probe 11 containing appropriate measuring instruments. Once the hole is drilled, a sealing element 12 is fitted on orifice 9 of shield 8, of the packing type including (FIG. 2) a plate 13 with a central cylindrical part 14 having a central bore 15 whose section is adapted to that of tube 2. On this central part 14 is screwed a lid 16 having a passage section also adapted to that of the tube. A disk 17 made from a deformable material is disposed between the central part 14 and lid 16 and, compressed by screwing the lid, is intimately applied about the tube. Fixing means (not shown) are provided for fixing the plate 13 to shield 8. Plate 13 includes an orifice to which is fitted a pipe 18 connected (FIG. 1) to a fluid pumping system 10 through a valve 20.

Probe 1 is fixed to the end of tube 2 by a sealed connector 21 (FIG. 3). By means of this connector the measuring instruments contained in the probe are connected to the conductors of a multiconductor cable 22 running along the tube 2. Apertures 23 are formed in the vicinity of connector 21 in the wall of tube 2, for providing communication between the inside of the tube and the borehole 10. The section of the probe is generally greater than that of tube 2.

At its opposite end, the tube communicates with the pumping system 19 and with a control and recording device 24 (FIG. 1) via a rotary hydraulic and electric collector 25 (FIG. 4).

The collector 25 includes a hollow rod 26 which is fixed to the hub 27 of reel 1. Its side wall is provided with apertures 28 and its end opposite the reel with a bore 29. The part of the rod provided with apertures 28 is engaged inside a fixed ring 30. Seals 31 provide sealing between rod 26 and ring 30. A radial opening 32 in the ring provides communication between the inside of rod 26 and the pipe 33 connecting the pumping system 19. The end of tube 2 opposite the probe is engaged in a radial orifice 34 provided in the hub 27 of the reel.

The different conductors of the multiconductor cable 22 housed in tube 2 are connected, via a sealing element 35 closing the bore 29, to different contacts 36 at the periphery of the male part 37, rotating with the hub of the reel, of an electric connector. Different slip rings 38 of the fixed female part 40 of the electric connector provide, via a cable 39, electric connection of the different conductors of cable 22 with the control and recording system 24 (FIG. 1). The associated rod 26 and ring 30 allow a flow of fluid to be formed between tube 2 and the pumping system 19.

A synchronizing element 41 controls the hydraulic motor driving tracks 6 and motor 3 so as to maintain the linear feed speed of the straightened tube and the rotational speed of reel 1 equal.

Reel 1, its support, the hydraulic motor 3 and the pumping system 19 are advantageously disposed on a sledge 42 which is moved along the gallery 7 as it advances.

The device operates in the following way:

With a hole of appropriate section and length bored in front of shield 1, the measurement probe 11 is engaged therein. After passing through the feed device 4 and the straightening rollers 5, the end of tube 2 winding off reel 1 is fitted through the sealing element 12 (FIG. 2) and is connected to the probe. With the sealing element 12 fixed to shield 8, the feed device 4 is actuated so as to cause tube 2 and probe 11 which is secured thereto to advance through the borehole.

This movement continues without interruption until the probe reaches the required depth. From the counting means of the feed device 4 the depth of tube 2 driven into the borehole is known.

When good coupling between the probe and the surrounding formations is required, the bored hole is filled with the fluid provided by the pumping system 19. For driving out the air pockets which may form in the annular space about the tube, a flow of water may be provided through the hydraulic circuit 18, 20, 22, 2, 23. Advantageously a pumping device is used capable of establishing in the circuit a flow of fluid in one direction or in the opposite direction. This allows the slant of the borehole to be adapted with respect to the horizontal. If the borehole slopes upwardly, the air pockets are driven out more readily by injecting fluid through pipe 18, return to the pumping system 19 taking place through the inside of tube 2. If on the contrary, the borehole slopes downwardly, fluid is injected through the inside of tube 2, the return taking place through pipe 18.

With the holes suitably filled with fluid and maintained under pressure if required, the probe is actuated and the operations for rewinding tube 2 on reel 1 are carried out, these two actions being able to be conducted simultaneously so as to make continuous measurements along the borehole. They may also be conducted alternately so as to obtain a discontinuous set of measurements.

The data collected is transferred to the control and recording device 24 (FIG. 1), through cable 22. The exact position of the probe inside the borehole is known at all times through the counting means of the feed system 4.

When all the measurement data has been recorded, the sealing element 12 is removed and the probe is withdrawn from orifice 9 which may again be used for the boring operations of the tunnel or gallery.

From the recorded date, a representation of the formations to be bored can be obtained and so the progress of the boring operations is optimized.

Without departing from the scope and spirit of the invention, the tracks for driving the semirigid tube may be replaced by any equivalent means such as a motor driven roller assembly.

Similarly, the semirigid tube may be replaced by any elongate element able to be wound on a storage reel and sufficiently rigid for transmitting to the probe the forces required for driving it. It may for example be a conventional well logging cable possibly made rigid by external armouring, the whole being possibly provided with a protective sheath.

What is claimed is:

1. A device for making measurements in geological formations from a horizontal borehole or a borehole with limited slant with respect to the horizontal made in the wall of an underground way including a probe containing measurement instruments adapted to be introduced into the borehole, which device further comprises an elongate element adapted to be wound on a storage reel, the probe being secured to said elongate element, feed means disposed between the circular support and the orifice of the borehole for moving the elongate element as it unwinds from the storage reel and the associated probe linearly therethrough, sealing means engageable on the orifice of the borehole for isolating the inside of the borehole from the underground way and a fluid pumping system for filling the borehole.

2. The device as claimed in claim 1, wherein said feed means include a set of rollers aligned in a common direction for guiding the elongate element and drive means for rotating the rollers of said assembly.

3. The device as claimed in claim 1, wherein the storage reel is provided with rotary connection means for connecting the elongate element to external apparatus.

4. The device as claimed in claim 3, wherein a transmission cable, connected to the measuring instruments of the probe, passes through the inside of the elongate element, the rotary connection means including a rotary electric collector means for connecting the transmission cable to an electronic control and recording system.

5. The device as claimed in claim 4, wherein said connectios means include a rotary hydraulic collector for connecting the inside of the elongate element to the fluid pumping system.

6. The device as claimed in claim 1, wherein said feed means include tracks actuated by drive means and a set of rollers for straightening the elongate element winding off said reel.

7. The device as claimed in claim 1, wherein said sealing means include a plate adapted for closing the opening of the bored hole, this plate including a passage for said elongate element, and an element for applying a seal about said elongate element.

8. The device as claimed in claim 7, wherein said fluid pumping system is connected with the inside of the bored hole through a pipe fitted to an orifice of the plate.

9. The device as claimed in claim 8, wherein said pipe is provided with a valve for causing the inside of the borehole to communicate intermittently with the pumping system, said elongate element having openings for communicating the inside of the elongate element with the borehole.

10. The device as claimed in claim 1, wherein said elongate element is a semirigid tube.

11. The device as claimed in claim 1, wherein said elongate element is a cable.

12. A method for making measurements in geological formations in a horizontal borehole or a borehole with a limited slant with respect to the horizontal, formed in a wall of an underground way, with a probe containing a measuring instrument and adapted to be coupled by liquid in operation with said geological formations, said method comprising fixing said probe to an elongate hollow member that is wound on a storage reel and that is sufficiently rigid to move the probe along the borehole; connecting said hollow member to a pumping means for providing liquid under pressure; introducing the probe into the borehole; confining an annular space formed between said hollow member and the borehole from said underground way; moving said probe along the borehole by reeling said hollow member off the storage reel; injecting liquid into said borehole, thereby filling at least a portion of the borehole around said probe; making measurements with said probe during movement of the probe along the borehole; and retracting the probe by winding of said hollow member onto said storage reel.

* * * * *